United States Patent [19]

Anderson et al.

[11] Patent Number: 5,749,289
[45] Date of Patent: May 12, 1998

[54] TALL SLEEVES FOR ROUND BALER DRIVE ROLLS

[75] Inventors: J. Dale Anderson, Canton; LaVern Roy Goossen, Newton, both of Kans.

[73] Assignee: Hay & Forage Industries, Hesston, Kans.

[21] Appl. No.: 733,757

[22] Filed: Oct. 18, 1996

[51] Int. Cl.⁶ .................................................. A01F 15/07
[52] U.S. Cl. ........................... 100/88; 56/341; 198/817
[58] Field of Search ............................ 100/5, 13, 88; 56/341; 198/817, 842, 843

[56] References Cited

U.S. PATENT DOCUMENTS

| | | |
|---|---|---|
| 4,371,580 | 2/1983 | Morrison et al. |
| 4,428,282 | 1/1984 | Anstey. |
| 4,444,098 | 4/1984 | Soteropulos ............................. 100/88 |
| 4,581,879 | 4/1986 | Anstey. |
| 5,097,760 | 3/1992 | Ratzlaff et al. .......................... 100/88 |
| 5,165,333 | 11/1992 | Ratzlaff et al. |
| 5,181,461 | 1/1993 | Viaud. |
| 5,193,450 | 3/1993 | Anderson. |

FOREIGN PATENT DOCUMENTS 1261580  10/1986  U.S.S.R. .................................. 100/88

*Primary Examiner*—Stephen F. Gerrity
*Attorney, Agent, or Firm*—Hovey,Williams, Timmons & Collins

[57] ABSTRACT

The belt-type round baler has a drive roll for reducing trash and crop material accumulation thereon, with a longitudinal central body and a plurality of belt-engaging portions projecting radially from the central body at points spaced along the length of the body such that each portion underlies a corresponding belt. Each portion has a top surface that engages the corresponding belt and cooperates with the central body to define a portion height. The top surfaces are narrower than the corresponding belts so that the sides of the belt each overhang the portion. The portion height is at least 1.25 times the corresponding belt thickness, while each of the sides of the belt overhangs the sleeve by a distance that is no less than 2.0 times the belt thickness.

8 Claims, 2 Drawing Sheets

TALL SLEEVES FOR ROUND BALER DRIVE ROLLS

CROSS-REFERENCE TO RELATED APPLICATIONS

See also the following contemporaneously filed applications entitled ROUND BALER HAVING TAILGATE-RESPONSIVE CLUTCH; entitled DOWN TURNING STUB AUGERS ON WIDE PICK-UP FOR ROUND BALERS; entitled OVER-THE-TOP SUPPORT ARM FOR PICK-UP GAUGE WHEEL OF A BALER; entitled EASED INLET TAILGATE ROLL ARRANGEMENT FOR VARIABLE CHAMBER ROUND BALER; and entitled END OF ROUND BALE TWINE GUIDES.

BACKGROUND OF THE INVENTION

1. Field of the Invention

The present invention relates generally to belt-type round balers and, more particularly, to a drive roll having structure to reduce accumulation of trash at pinch points between the belts and roll.

2. Discussion of Prior Art

Belt-type balers are variously known as fixed chamber or variable chamber balers, both of which may utilize cooperating sets of flexible belts to form a baling chamber, within which crop material is compressed and rolled into a round bale. In either situation, the baler includes a series of transverse rolls rotatably mounted to the sidewalls of the baler for driving and guiding the belts along a longitudinal path. A problem with belt-type round balers is the tendency for loose trash and stringy materials to accumulate on the surface of these rolls. Particularly, the belts and rolls of a baler are constantly contacting the relatively loose crop material newly added to the periphery of the bale. The pinch points between the belts and rolls tend to grab the loosely held hay and entrap the hay therebetween such that material is wrapped around the roll. As appreciated by those of ordinary skill in the art, this problem is detrimental to various components and operations of the baler, such as belt tracking and wear and bale formation as crop material accumulates in the vicinity of the rolls.

Trash and crop material accumulation is especially problematic on the drive rolls of the machine. It is important to maintain driving engagement between the drive rolls and belts, otherwise baling operations necessarily stop. Of course, crop material and trash entrapped between the drive rolls and belts are detrimental to such driving engagement. Additionally, the drive rolls are often disposed in a relatively low position within the baler such that hay sloughing off the bale falls downwardly toward the drive rolls, thereby exposing the drive rolls to additional loose crop material. Trash and crop material accumulation is also especially problematic along the sidewalls of the baler, upon which the rolls are rotatably mounted. As the sides of the revolving bale contact the non-moving sidewalls, the latter tend to loosen the sides of the bale and, in some instances, shear crop material from the sides of the bale. Such action increases the opportunity for loose crop material to become entrapped between the belts and the ends of the rolls.

Various roll constructions and baler designs have been devised for eliminating crop material accumulation on the surface of the rolls. For example, a cleaner bar has been placed in close proximity with a roll for wiping crop material from the roll. Alternatively, devices such as driven cleanout discs have been placed within the spaces defined between adjacent belts for preventing the belts from transferring crop material toward and about the rolls. In a number of balers, the length of drive rolls have been shortened so that the ends of the rolls terminate short of the sidewalls of the baler, whereby the outermost belts have an outboard side which overhangs the roll so as to eliminate the exposed pinch point between the belt edges and the roll. Such a drive roll construction is utilized to minimize trash accumulation on the ends of the drive roll adjacent the sidewalls and is disclosed in U.S. Pat. No. 5,193,450, entitled RESIDUE REDUCING BELT ROLLER CONSTRUCTION FOR ROUND BALERS, assigned of record to the assignee of the present invention.

In some instances, the outer, cylindrical surface of a roll has been configured for reducing crop material and trash accumulation thereon. Particularly, radially enlarged sleeves have been spaced along the length of a roll for underlying the relatively wider belts, whereby the sides of each belt overhang a corresponding sleeve and are spaced slightly above the main core body of the roll, so that the pinch points between the belts and rolls are not exposed. Such a roll construction is the subject of U.S. Pat. No. 4,428,282, entitled CYLINDRICAL BALER WITH SELF-CLEANING DRIVE ROLLER. In U.S. Pat. No. 5,165,333, entitled ROUND BALER HAVING ANTI-WRAPPING IDLER ROLLS, assigned of record to the assignee of the present invention, a pair of idler rolls are disclosed as having a number of belt-engaging portions spaced along the respective lengths thereof, with certain portions having a larger diameter than others so that the belts, which move longitudinally at generally the same speeds, slip relative to the surfaces of some of the portions due to the varying peripheral speeds of the portions. Accordingly, some of the belt-engaging portions of the idler rolls are subjected to a slight abrading or scuffing action to maintain the portions in a polished, trash-free condition.

OBJECTS AND SUMMARY OF THE INVENTION

An important object of the present invention is to provide a belt-type round baler with structure for minimizing crop material and trash accumulation on the surface of desired rolls. Another object of the present invention is to provide certain rolls of the belt-type baler with structure on the surface of the rolls to eliminate exposure of the pinch points between the rolls and belts. Yet another object of the present invention is to provide certain rolls of the belt-type baler with radially enlarged belt-engaging portions, each underlying a relatively wider belt so that the belts overhang the portions. The present invention contemplates a particular relationship between the height of the belt-engaging portions, the thickness of the belt and the amount of belt overhang; wherein such relationship has proven highly adaptable to various belt sizes and extraordinary in maintaining the surfaces of the desired rolls trash-free. Accordingly, another object of the present invention is to provide a belt-type baler having improved trash cleaning capabilities derived from a unique relationship between the height of the belt-engaging portions, the thickness of the belt and the amount of belt overhang, as described hereinbelow.

In accordance with these and other objects evident from the following description of a preferred embodiment of the invention, the belt-type round baler includes a drive roll having a longitudinal central body and a plurality of belt-engaging portions projecting radially from the central body at points spaced along the length of the body such that each portion underlies a corresponding belt. Each portion has a top surface that engages the corresponding belt and cooperates with the central body to define a portion height. Furthermore, the top surfaces are narrower than the corresponding belts so that the sides of the belt each overhang the portion. The portion height is at least 1.25 times the corresponding belt thickness, while each of the sides of the belt overhangs the sleeve by a distance that is no less than 2.0 times the belt thickness. These relationships have proven to significantly reduce crop material and trash accumulation on the drive roll in various operating conditions. Furthermore, because both the portion height and distance of belt overhang are related to the belt thickness, the inventive relationship is adaptable to various belt sizes.

If desired, the portion heights may be substantially similar, and the top surfaces may be substantially flat, viewing the roll in longitudonal cross-section. Furthermore, in the preferred baler, the belts supported on the outboard belt-engaging portions (adjacent the ends of the drive roll) each present an outboard side adjacent the sides of the baler, which overhang the outboard portions by a distance that is greater than the remaining distances of belt overhang. The preferred drive roll also has the belt-engaging portions integrally formed with the central body. The preferred drive roll is configured so that each belt is supported above the central body of the drive roll by a corresponding underlying portion.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figures 1, 4:
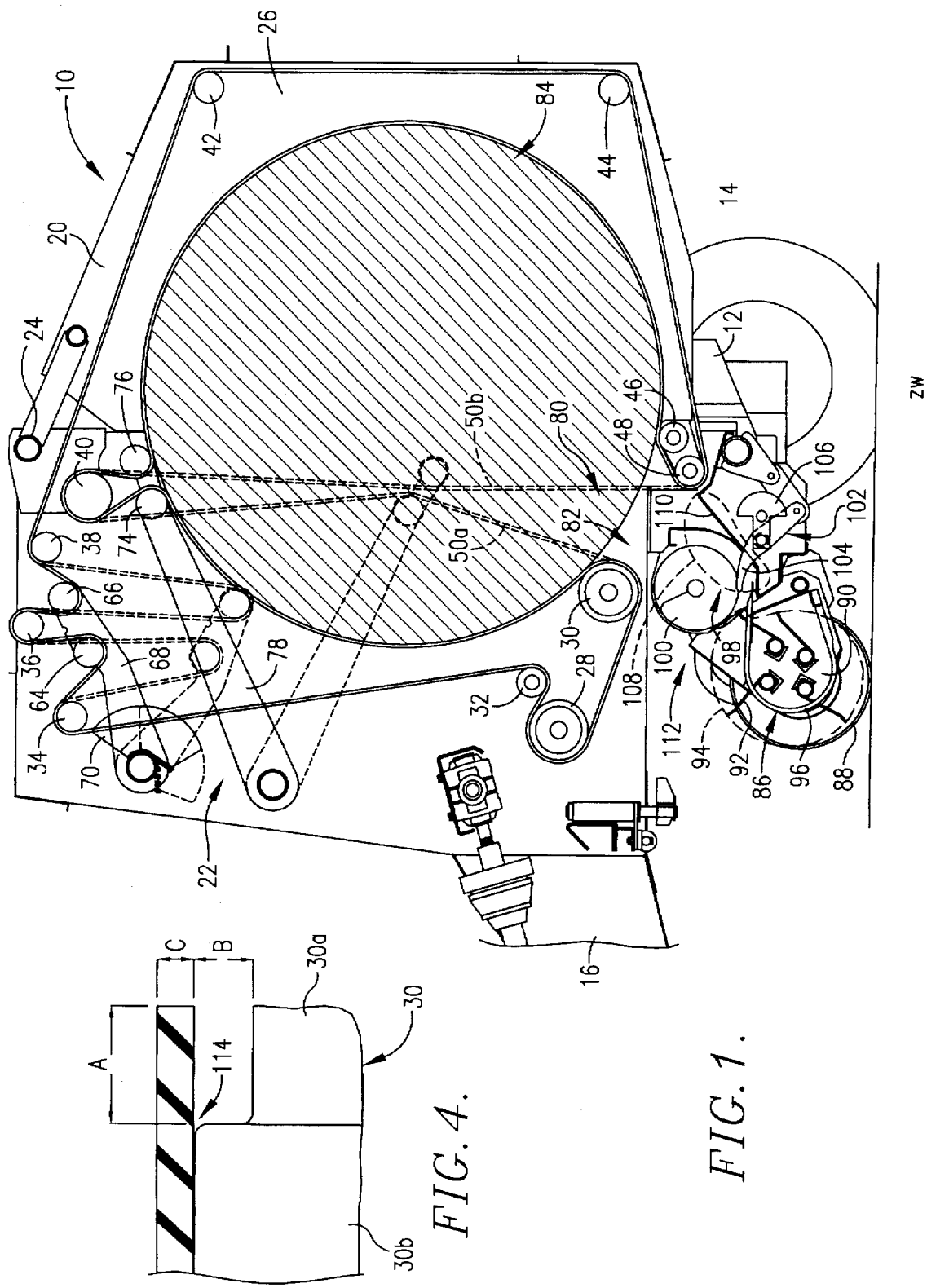
FIG. 1 is a fragmentary, side elevational view of a variable chamber round baler with its left sidewall removed to reveal internal details of construction, such baler employing improved drive rolls constructed in accordance with the present invention and showing in full lines a full size, ready-to-wrap bale within the baling chamber of the machine.
FIG. 4 is an enlarged, fragmentary, diagrammatic view of the rear drive roll and a belt particularly illustrating the dimensional relationships between the portion height, overhang distance and belt thickness.

Turning now to FIG. 1, the round baler 10 selected for illustration generally includes a chassis 12 having ground wheels 14 and a forwardly extending tongue 16 that is adapted for connection with a towing vehicle (not shown). The chassis 12 carries a pair of upright, laterally spaced sidewalls 18 and 20 (see also FIG. 2) which cooperate to define a space within which bale forming and wrapping operations may be carried out as the baler is advanced across a field. Within the space defined between the sidewalls 18 and 20, the baler 10 further includes bale forming mechanism 22 for compacting and rolling crop material into a round bale.

The sidewalls 18,20 present stationary forward portions fixed to the chassis 12 by suitable means and rearward portions swingably attached to the forward portions by a pivot assembly 24. The rearward portions of the sidewalls 18,20 cooperatively define a tailgate 26 which is swingable between an open, discharge position (not shown), in which the tailgate 26 has sufficiently raised to allow a completely formed bale to be discharged from the baler 10, and a closed, baling position (FIG. 1), in which bale wrapping and rolling operations are performed.

In the illustrated embodiment, the bale forming mechanism 22 and sidewalls 18,20 cooperate to define a so-called "variable chamber", belt-type machine, wherein the baling chamber is initially relatively small and then grows progressively larger as the bale increases in diameter within the baler 10. It will be appreciated, however, that the principles of the present invention are equally applicable to a "fixed chamber", belt-type baling machine in which the dimensions of the baling chamber are at least substantially constant throughout the baling cycle, with the diameter of the chamber corresponding substantially with the diameter of the full size bale when completed.

With the foregoing caveat in mind, the bale forming mechanism 22 of the variable chamber baler illustrated herein include a series of cooperating belts and rolls supported by the sidewalls 18,20 for rolling and compacting a bale as it forms within the baler 10. The baler 10 is provided with a plurality of laterally extending, stationary rolls including a pair of front and rear drive rolls 28 and 30, idler rolls 32,34,36,38,40,42,44, and a pair of tailgate-mounted rear inlet rolls 46,48. The rolls 28–48 span the sidewalls 18,20 and are arranged in a generally circular pattern viewing FIG. 1 for guiding a plurality of endless, laterally spaced, side-by-side belts 50 as the belts 50 are driven linearly during bale formation and wrapping.

Figure 2:
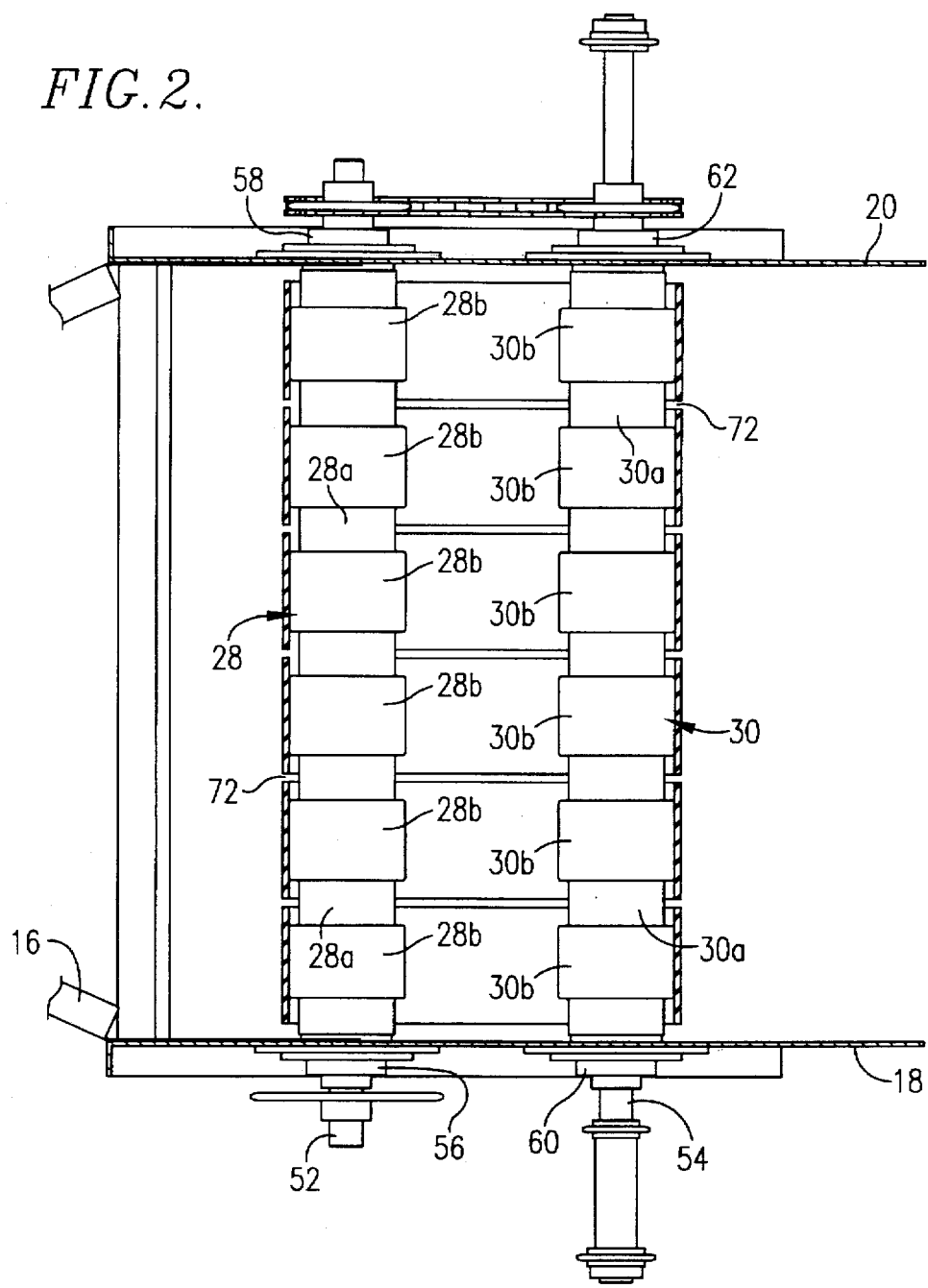
FIG. 2 is an enlarged, fragmentary, top plan view of the front portion of the baler illustrated in FIG. 1, particularly illustrating the front and rear drive rolls having the radially enlarged belt-engaging portions.

As best shown in FIG. 2, the drive rolls 28 and 30 are fixedly carried on shafts 52 and 54, respectively. A pair of bearing assemblies 56 and 58 are secured to the sidewalls 18 and 20, respectively, to journal each end of the shaft 52 on the sidewalls. Similarly, a pair of bearing assemblies 60 and 62 rotatably support the shaft 104 on respective sidewalls 18 and 20. It will be appreciated that the remaining rolls 32–48 are rotatably mounted to the sidewalls 18,20 in a similar fashion.

The bale forming mechanism further includes a pair of movable slack takeup rolls 64 and 66 mounted near the upper portion of the baler 10 on downwardly spring biased arm structure 68 to maintain tension on the belts 50, yet permit the paying out of stored slack as the bale increases in diameter during formation. Although not illustrated in detail, it will be appreciated that the arm structure 68 carries a plurality of laterally spaced tracking guides 70, each of which are disposed within corresponding spaces 72 (FIG. 2) defined between adjacent belts 50 for preventing lateral shifting of the belts. Near the fore-and-aft center of the baler 10, the belts 50 are looped under the rear drive roll 30, over the upper idler roll 40, and under the front tailgate mounted roll 48 to present a pair of opposed, front and rear belt stretches 50a and 50b, which are initially generally upright, as illustrated in phantom in FIG. 1, but which become bowed out in fore-and-aft directions, as illustrated in solid lines, as the bale grows beyond its initial starting core dimensions. A pair of retaining rolls 74 and 76 are mounted on a second swingable arm structure 78 that is also spring biased downwardly to the phantom line position in FIG. 1; the retaining rolls 74,76 receiving the belt stretches 50a and 50b therebetween so as to form a baling chamber 80 between the stretches 50a, 50b which is bounded at the sides by the sidewalls 18,20.

The chamber 80 illustrated in FIG. 1 is open at the bottom to present a crop infeed opening or crop inlet 82 that is defined between the rear drive roll 30 and the front tailgate-mounted roll 48. It will be appreciated that the vertical and fore-and-aft spacing of the rear inlet rolls 46,48 provide an eased crop inlet configuration that has proven very effective in introducing crop material into the baling chamber 80. The eased inlet configuration discussed hereinabove is disclosed in contemporaneously filed application for U.S. Letters patent entitled EASED INLET TAILGATE ROLL ARRANGEMENT FOR VARIABLE CHAMBER ROUND BALER, in the names of Howard J. Ratzlaff, J. Dale Anderson, Craig Pecenka and Ferol S. Fell.

The drive rolls 28 and 30, on the other hand, are drivingly coupled with the power source of the towing vehicle to drive the belts 50 and are driven in clockwise directions viewing FIG. 1. Thus, when the baling chamber 80 is in its initial upright condition, as shown in phantom in FIG. 1, the front stretch 50a is moving generally downwardly and forwardly while the rear stretch 50b is moving generally upwardly. Consequently, hay introduced into the chamber 80 via the crop infeed opening 82 is acted upon by the upwardly moving rear stretch 50b and the downwardly moving front stretch 50a so as to tumble forwardly and eventually coil into a bale, generally denoted by the numeral 84.

A wide crop pickup 86, supported generally below and forwardly of the crop infeed opening 82, is operable to lift crop material off the ground as the baler 10 is advanced across a field. In the illustrated embodiment, the pickup 86 is a wide pickup that projects beyond the sidewalls 18,20 so that a large windrow that is wider than the baler itself may be delivered to the chamber 80. In short, the preferred pickup 86 includes adjustable gauge wheels 88 (only the right gauge wheel being illustrated) for maintaining the elevation of a retracting tine reel 90 as the baler 10 passes over uneven ground. Rotation of the pickup reel 90 drives the tines 92 along the path illustrated in phantom in FIG. 1 and generally denoted by the numeral 94. The pickup 86 further includes a generally U-shaped panel 96 extending forwardly from the chassis 12 and having a plurality of laterally spaced slots (not shown) through which corresponding tines 92 project as the tines move upwardly and rearwardly along the path 94.

As the crop material is picked up off the ground, it flows generally rearwardly along the outer surface of the panel 96 and to a transfer mechanism, generally denoted by the numeral 98, which serves to centralize the flow of crop material from the pickup 86 and transfer it to the infeed opening 82. The transfer mechanism 98 preferably includes a pair of center-gathering, left and right stub augers 100 (only the right stub auger being illustrated). It will be appreciated that the augers 100 are driven to converge the flow of crop material to a width generally equal to the width of the baling chamber 80. A fork-type stuffer 102 having a plurality of laterally spaced prongs 104 is driven by crank 106 along a path 108 to feed the converged flow of crop material rearwardly through the crop inlet 82 and into the chamber 80. An inclined ramp 110 positioned between the infeed opening 82 and the panel 96 of the pickup 86 has a plurality of laterally spaced slots (not shown), each configured for receiving a corresponding prong 104. As indicated by the path 108, the prongs 104 project through the slots of the ramp 110 as they move rearwardly to move crop material along the ramp and to the crop inlet 82.

The pickup 86 and transfer mechanism 98 discussed hereinabove are disclosed in contemporaneously filed application entitled DOWN TURNING STUB AUGERS ON WIDE PICK-UP FOR ROUND BALERS, in names of Howard J. Ratzlaff and J. Dale Anderson. As those of ordinary skill in the art will appreciate, the baler illustrated in the drawings is known as an "open throat" baler in view of the fact that the throat area, generally referenced by the number 112, leading from the front of the pickup 46 to the baling chamber 80 is completely open and unobstructed, without the presence of compression rollers or the like.

Tall Sleeves

As best shown in FIG. 2, the drive rolls 28 and 30 include longitudinal, generally cylindrical central bodies 28a and 30a, which are fixedly connected to the shafts 52 and 54, respectively. Spaced along the length of the bodies 28a and 30a are a plurality of radially enlarged belt-engaging portions in the form of sleeves 28b and 30b, respectively. In the illustrated embodiment, the sleeves 28b and 30b are integral with the respective bodies 28a and 30a. Particularly, the central bodies 28a and 30a and respective sleeves 28b and 30b are formed of a synthetic rubberlike material and molded directly onto the shafts 52 and 54, such that the central body essentially forms a sheath which encircles the corresponding shaft. The rubber sleeves 28b,30b provide aggressive driving engagement with the belts. It will be appreciated, however, that the principles of the present invention are equally applicable to various other drive roll constructions, such as a drive roll having a central body and collars removably attached to the body at points spaced along the length thereof For the sake of brevity, the remaining discussion of the drive rolls 28,30 will focus primarily on the rear drive roll 30, since the drive rolls 28,30 are nearly identical in construction.

Figure 3:
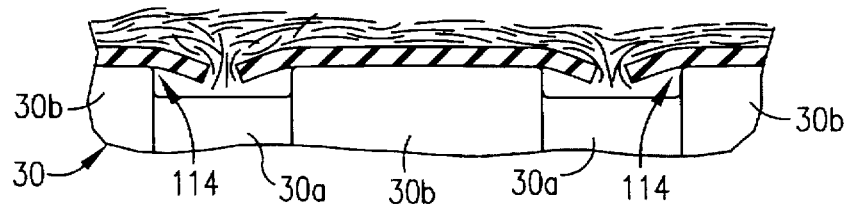
FIG. 3 is an enlarged, fragmentary, front elevational view of the rear drive roll, particularly illustrating the belts and roll pressing against the periphery of the bale.

As shown in FIGS. 3 and 4, the sleeves 30b present a substantially flat top surface which engages the underside of the belts 50, although the top surface may be crowned to assist with straight tracking of the belts. The top surface of each sleeve 30b cooperates with the central body 30a of the drive roll to define a sleeve height referenced by the letter B in FIG. 4. Furthermore, the sleeves 30b are relatively narrower than the width of the belts 50 such that the sides of the belts overhang the sleeves by a distance referenced by the letter A in FIG. 4. It has been determined that reduction in trash and crop material accumulation on the drive roll 30 is a function of the sleeve height B and belt overhang distance A relative to the belt thickness, referenced by the letter C in FIG. 4.

Particularly, trash and crop material accumulation on the rolls has been found to be significantly reduced when the sleeve height is at least 1.25 times the belt thickness C, and the belt overhang distance A is at least two times the belt thickness C. This characteristic of the drive roll 30 may be attributed to various features of the relationship. For example, pinch points 114 between the side edges of the top surface of the sleeve 30b and the underside of the corresponding belt 50 are not exposed, nor in direct contact, with the loose hay material. Additionally, the sleeve height B provides a sufficient space defined between the overhanging belt and the central body 30a to prevent entrapment of hay therein. Furthermore, because the belt overhang distance A and sleeve height B are related to the belt thickness C, the belts are prevented from drooping down toward the central body 30a and creating a pinch point therebetween.

It will be appreciated that the illustrated embodiment employs belts which are the subject of U.S. Pat. No. 4,371,580, entitled THREE-PLY BELTING MATERIAL, issued to the Morrison Company, Inc., Anthony, Kans.; such belts being distributed by the Morrison Company under the designation "Three-ply Baler Belting". Preferably, the overall belt thickness C is approximately 9.5 mm or 0.37 in. Although this type of belt is widely employed in round balers, the relationship may be utilized with various other belt sizes and constructions.

Preferably, the belt overhang distance A is 27.5 mm or 1.05 in., and the sleeve height is 18.9 mm or 0.744 in. As previously, indicated, the problem of crop material accumulation on the drive roll 30 is magnified along the sidewalls 18,20. Accordingly, in the illustrated embodiment, the outboard sleeves adjacent the ends of the roll 30 are configured so that the outboard sides of the corresponding belts overhang the roll a greater distance than the remaining overhang distances, whereby the pinch points are further concealed and a relatively larger space between the sidewalls, central body and belt is defined. The preferred outboard side overhang distance is approximately 1.25 in.

Although the front drive roll 28 is not in direct contact with the bale 84, it has also been determined that the provision of sleeves 28b tends to prevent trash and crop material, which may be carried to the front drive roll by the belts 50 are fall to the front drive roll as it sloughs off the bale 84, from wrapping around the front drive roll.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the sleeved drive rolls 28,30 may be provided on a variety of fixed and variable chamber, belt-type round balers other than the baler 10 illustrated in FIGS. 1–4.

The inventors hereby state their intent to rely on the Doctrine of Equivalents for determining and assessing the reasonably fair scope of the present invention as pertains to any apparatus not materially departing from but outside the literal scope of the invention as set forth in the following claims.

What is claimed is:

1. In a round baler having a plurality of flexible, side-by-side belts driven in a longitudinal direction by at least one transversely extending drive roll around which the belts are looped, the improvement comprising:

said drive roll having a longitudinal central body and a plurality of belt-engaging portions projecting radially from the central body at points spaced along the length of the body, each of said portions underlying a corresponding belt, said portions each having a top surface that engages the corresponding belt and cooperates with the central body to define a portion height that is at least 1.25 times the corresponding belt thickness, said top surface being narrower than the corresponding belt such that the sides of the belt each overhang the portion by a distance that is no less than 2.0 times the corresponding belt thickness.

2. In a round baler as claimed in claim 1, said portion heights being substantially similar.

3. In a round baler as claimed in claim 2, said top surfaces being substantially flat.

4. In a round baler as claimed in claim 3, said baler having at least two of said drive rolls.

5. In a round baler as claimed in claim 1, said belt thickness being about 0.37 in., said portion height being about 0.744 in., said distance of belt overhang being about 1.05 in.

6. In a round baler as claimed in claim 1, said portions including a pair of outboard portions adjacent the ends of the drive roll, whereby the corresponding belts each present an outboard side adjacent the sides of the baler, said outboard sides overhanging the outboard portions by a distance that is greater than the remaining distances of belt overhang.

7. In a round baler as claimed in claim 1, said portions being integral with the central body.

8. In a round baler as claimed in claim 1, said portions and said belts being coequal in number such that each of the belts engages the top surface of a corresponding underlying portion.

* * * * *